J. DOURSON & C. HORN.

Improvement in Fall-Leaf Extension-Tables.

No. 4,351. Reissued April 25, 1871.

Witnesses:

John Becker

Wm. H. C. Smith.

Inventor:

J. Dourson.

C. Horn.

PER Munn & Co.

Attorneys.

AM. PHOTO-LITHOGRAPHIC CO. N.Y. (OSBORNE'S PROCESS)

United States Patent Office.

JACOB DOURSON, OF COLUMBUS, OHIO.

Letters Patent No. 87,829, dated March 16, 1869; reissue No. 4.351, dated April 25, 1871.

IMPROVEMENT IN FALL-LEAF EXTENSION-TABLES.

The Schedule referred to in these Letters Patent and making part of the same.

*To all whom it may concern:*

Be it known that I, JACOB DOURSON, of Columbus, in the county of Franklin and State of Ohio, has invented a new and improved Fall-Leaf Extension-Table; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
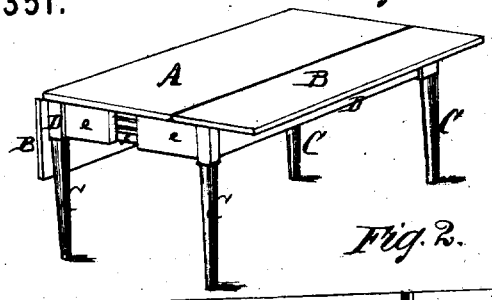
Figure 1 is a perspective view of the improved fall-leaf extension-table.

This invention relates to a new arrangement of drop-leaf tables, and consists in attaching the legs of the table to sliding frames, so that they can be drawn under the leaves to hold them up.

Drop-leaf tables have been in use heretofore, also extension-tables, but the combination of a lower extension-frame with the drop-leaves for sustaining the same has not been introduced prior to this invention.

The great objection to ordinary drop-leaf tables, that the leaves usually break at the hinges, is overcome by this invention, as the extended legs constitute an inflexible support for the raised leaf.

A in the drawing represents the fixed top of the table.

B B are the drop-leaves hinged to the fixed top.

C C are the legs, secured to the side rails D D.

When the drop-leaves are folded down or suspended the rails D are under the sides of the fixed top A, and sustain the same.

When, however, a leaf is turned up, the rail nearest its hinged edge is pulled out under the leaf and sustains it in the horizontal position, the legs that hold said rail being moved out with it.

Strips *e e* project from the upper ends of the legs transversely under the fixed top A, and sustain the same, when the legs are with the rail carried under the leaf.

The strips *e e* rest with their inner faces against the outer sides of fixed ribs *f*, which project from the under side of the fixed top A.

Figure 5:
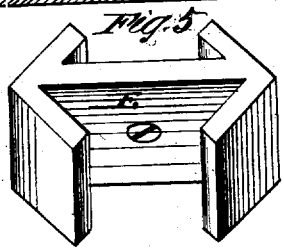
Figure 5 is a detail perspective view of the metallic slide.

A slide, E, as shown in fig. 5, is affixed to the end of each strip *e*, and enters the grooved outer side of the adjoining rib *f*, in which it slides when the legs and rails are moved in or out.

The slide serves, therefore, as a connection between the sliding rails and strips *e e* and the fixed ribs *f*.

Figure 2:
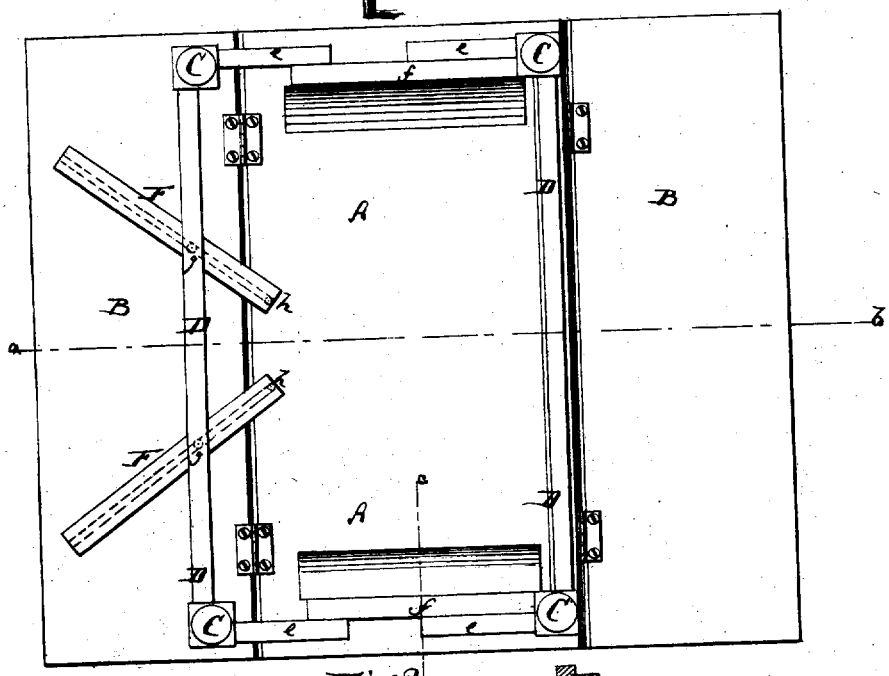
Figure 2 is an inverted plan view of the same.
Figure 3:
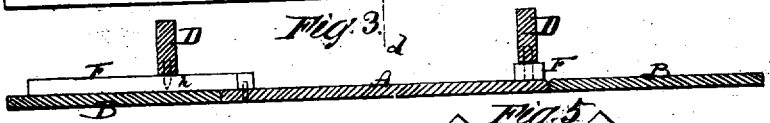
Figure 3 is an inverted transverse section of the same taken on the plane of the line *a b*, fig. 2.
Figure 4:
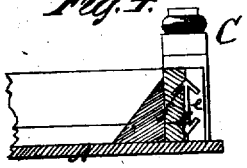
Figure 4 is a detail inverted vertical section on the line *c d*, fig. 2.

The middle part of each leaf may, if desired, be further sustained by supporting bars F F, which are, by pins *g g*, pivoted to the rails, and grooved longitudinally, as indicated by dotted lines in fig. 2.

Dowel-pins *h*, set in the under side of the top A, enter the grooves of the bars F.

When the rail is moved out under the table-leaf it swings the bars F out under the leaf, as shown in fig. 2, while before the said bars were folded against or upon the rail.

These automatic bars F may, however, be dispensed with, as the rails alone form sufficient support for the leaves.

I claim as my invention—

1. The drop-leaf table, provided with an extension leg and rails, which can be drawn out to support the opened leaves, as set forth.

2. The slide E, in combination with the parts *e f*, substantially as and for the purpose described.

3. The grooved bars F F, pivoted to the rails D, and combined with the dowel-pins *h* on the fixed table top, as set forth.

JACOB DOURSON.

Witnesses:

GEO. W. MABEE,

T. B. MOSHER.